(12) United States Patent
Hirunuma et al.

(10) Patent No.: US 6,914,636 B2
(45) Date of Patent: Jul. 5, 2005

(54) OPTICAL VIEWER INSTRUMENT WITH PHOTOGRAPHING FUNCTION

(75) Inventors: Ken Hirunuma, Tokyo (JP); Atsumi Kaneko, Tokyo (JP); Shuji Yoneyama, Saitama (JP); Moriyasu Kanai, Saitama (JP); Gouji Funatsu, Saitama (JP); Masami Shirai, Saitama (JP)

(73) Assignee: PENTAX Corporation, Tokyo (JP)

( * ) Notice: Subject to any disclaimer, the term of this patent is extended or adjusted under 35 U.S.C. 154(b) by 285 days.

(21) Appl. No.: 10/255,963

(22) Filed: Sep. 27, 2002

(65) Prior Publication Data

US 2003/0063189 A1 Apr. 3, 2003

(30) Foreign Application Priority Data

Sep. 28, 2001 (JP) ..................................... P2001-301664
Feb. 13, 2002 (JP) ..................................... P2002-035031

(51) Int. Cl.$^7$ ......................... H04N 5/225; G03B 17/02
(52) U.S. Cl. ....................... 348/376; 348/375; 396/535; 396/541
(58) Field of Search .................. 348/373, 374, 348/375, 376, 158, 333.01, 340; 396/535, 541

(56) References Cited

U.S. PATENT DOCUMENTS

| 4,067,027 A | 1/1978 | Yamazaki |
| 4,262,988 A | 4/1981 | Ishibai et al. |
| 4,400,065 A | 8/1983 | Nagler |

(Continued)

FOREIGN PATENT DOCUMENTS

| JP | 3-235491 | 10/1991 |
| JP | 3-242610 | 10/1991 |
| JP | 10-268399 | 10/1998 |
| JP | 11-112851 | 4/1999 |
| JP | 11-064743 | 5/1999 |
| JP | 11-160775 | 6/1999 |
| JP | 11-218692 | 8/1999 |
| JP | 11-248996 | 9/1999 |
| JP | 2000-147372 | 5/2000 |
| WO | 99/106870 | 2/1999 |
| WO | 01/38918 | 5/2001 |

OTHER PUBLICATIONS

English Language Abstract of JP 11–248996.
English Language Abstract of JP 2000–147372.
English Language Abstract of JP 11–112851.
English Language Abstract of JP 11–064743.
English Language Abstract of JP 3–235491.
English Language Abstract of JP 11–218692.
English Language Abstract of JP 10–268399.
English Language Abstract JP 11–160775.
English Language Abstract JP 3–242610.

*Primary Examiner*—Chris Kelley
*Assistant Examiner*—Erick Rekstad
(74) *Attorney, Agent, or Firm*—Greenblum & Bernstein, P.L.C.

(57) ABSTRACT

In an optical viewer instrument with a photographing function, a telescopic lens system for observing an object and a digital camera system for photographing the object are housed in a casing. A manually-operable rotary wheel is rotatably provided in the casing such that a portion of the rotary wheel is exposed to the outside from the casing to bring the object into focus through the telescopic lens system. A display panel unit for displaying the object as a motion picture on a display screen thereof is mounted on the casing so as to be movable between a retracted position, where the display screen of the display panel unit is close to a wall surface of the casing, and a display position, where the display screen of the display panel unit is directed to the ocular-lens-system side of the telescopic lens system. The rotary wheel is arranged such that the exposed portion of the manually-operable rotary wheel is hidden behind the display panel unit when being at the retracted position.

13 Claims, 13 Drawing Sheets

U.S. PATENT DOCUMENTS

| | | |
|---|---|---|
| 5,235,458 A | 8/1993 | Akagi et al. |
| 5,581,399 A | 12/1996 | Abe |
| 5,583,692 A | 12/1996 | Funatsu |
| 5,729,390 A | 3/1998 | Abe |
| 5,742,341 A | 4/1998 | Ohishi et al. |
| 5,926,657 A | 7/1999 | Hasushita |
| 5,963,369 A | 10/1999 | Steinthal et al. |
| 6,067,116 A * | 5/2000 | Yamano et al. ............ 348/372 |
| 6,088,053 A | 7/2000 | Hammack et al. |
| 6,255,650 B1 | 7/2001 | Warner et al. |
| 2001/0004269 A1 | 6/2001 | Shibata et al. |
| 2001/0028498 A1 | 10/2001 | Haga et al. |
| 2001/0043395 A1 | 11/2001 | Costales |
| 2002/0001474 A1 * | 1/2002 | Horiguchi .................. 396/535 |
| 2002/0054761 A1 * | 5/2002 | Cornell et al. ................ 396/85 |
| 2002/0109785 A1 | 8/2002 | Hammack et al. |
| 2003/0063383 A1 | 4/2003 | Costales |
| 2003/0227543 A1 | 12/2003 | Hammack et al. |

* cited by examiner

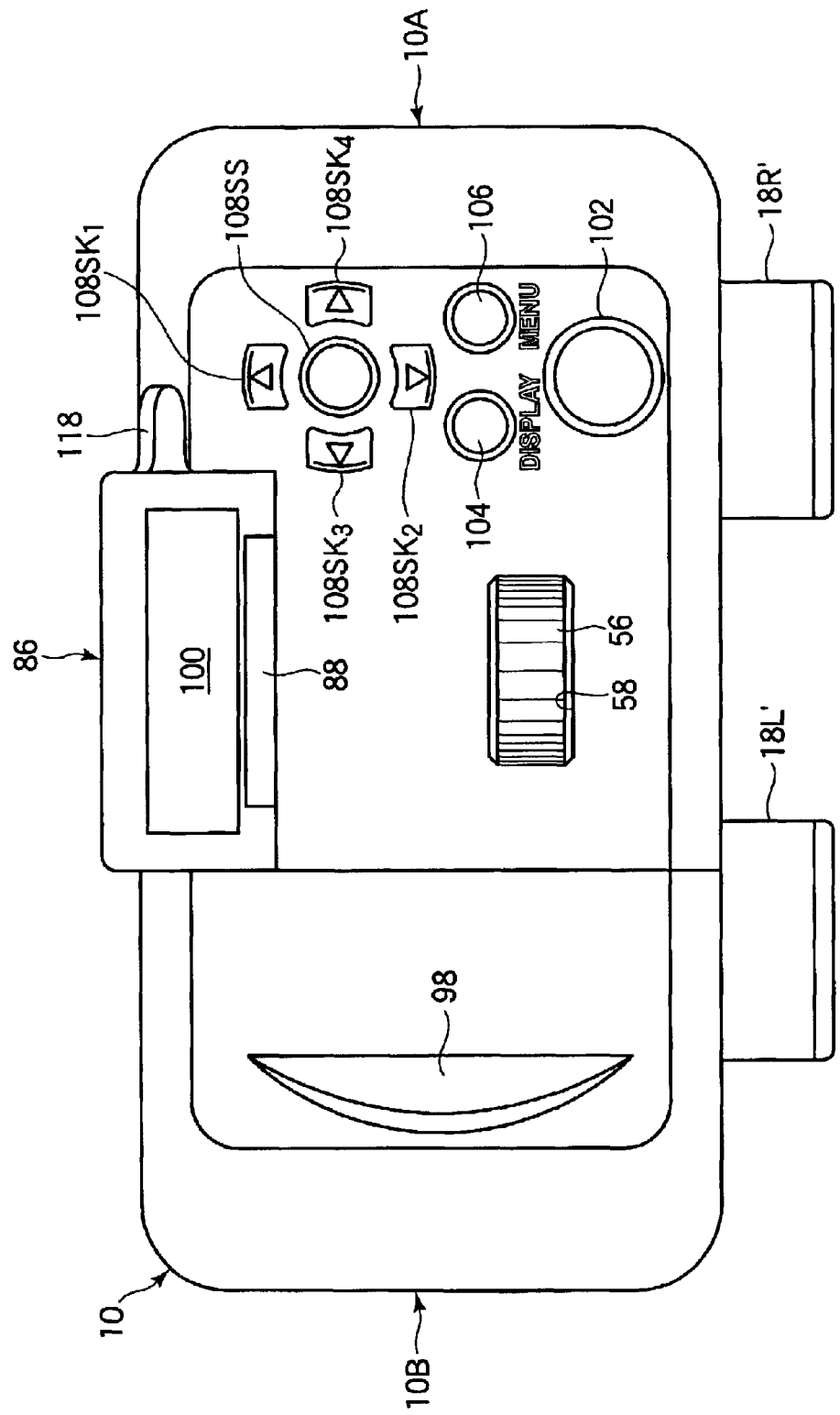

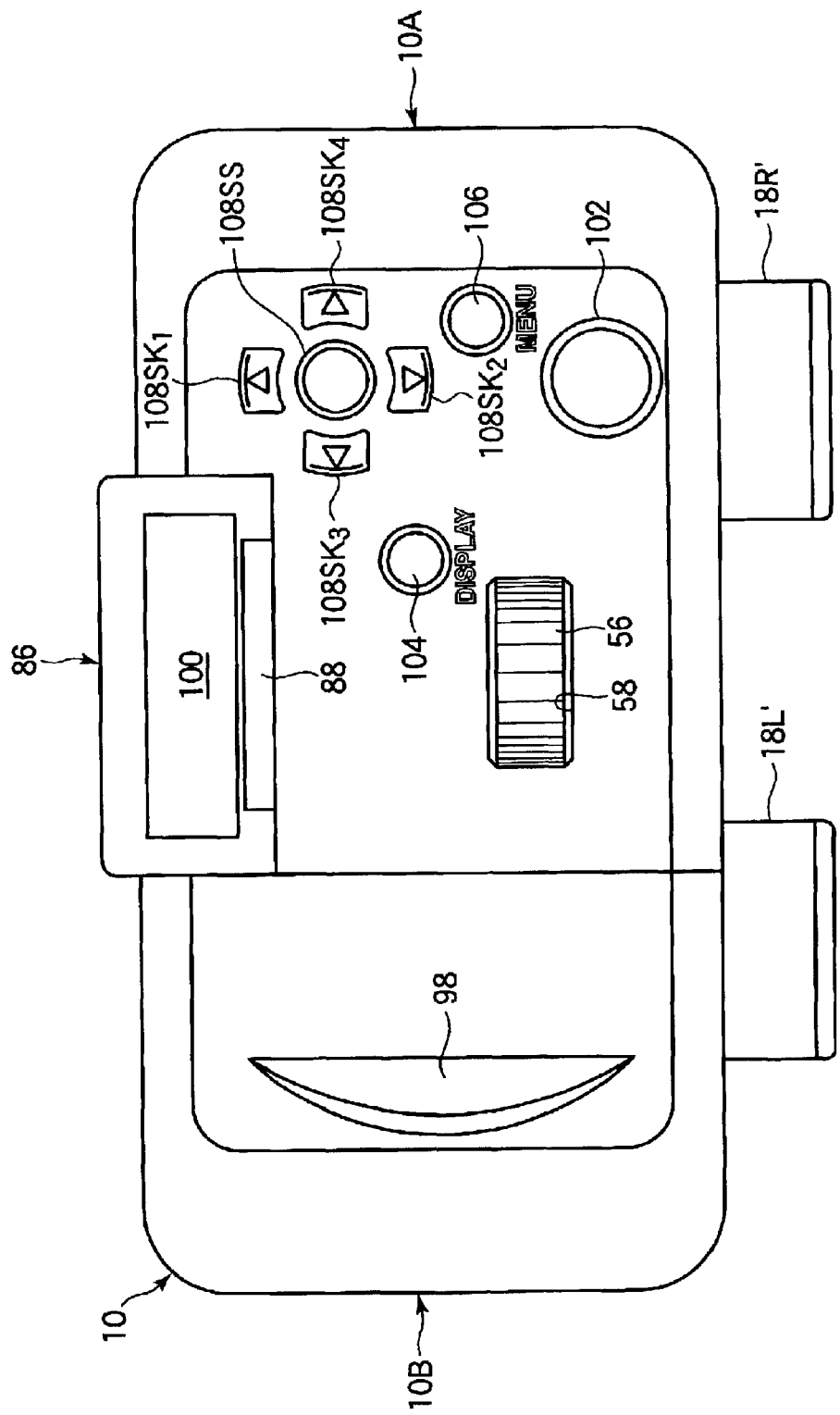

OPTICAL VIEWER INSTRUMENT WITH PHOTOGRAPHING FUNCTION

BACKGROUND OF THE INVENTION

1. Field of the Invention

The invention relates to an optical viewer instrument with a photographing function.

2. Description of the Related Art

As is well known, an optical viewer instrument, such as a binocular telescope, a single telescope or the like, is used for watching sports, wild birds, and so on. When using such an optical viewer instrument, it is often the case that the user sees something that he or she would like to photograph. Typically, he or she will fail to photograph the desired scene because he or she must exchange a camera for the optical viewer instrument and during this time the chance is lost. For this reason, an optical viewer instrument containing a camera is proposed, whereby a photograph can be taken immediately by using the camera contained in the optical viewer instrument while continuing the observation through the optical viewer instrument.

For example, Japanese Laid-Open Utility Model Publication (KOKAI) No. 6-2330 discloses a combination of a binocular telescope and a camera, in which the camera is simply mounted on the binocular telescope. Of course, the binocular telescope includes a pair of telescopic lens systems, and the camera includes a photographing lens system. While an object is observed through the pair of telescopic lens systems, the observed object can be photographed by the camera. Also, this binocular telescope with the camera is bulky, and is not so easy to handle, because the camera is simply added to the binocular telescope.

In a case where a digital camera is combined with an optical viewer instrument, it is desirable to incorporate a display panel unit, such as a liquid crystal display (LCD) panel unit, in the optical viewer instrument with the digital camera to monitor an object to be photographed, similar to a conventional digital camera. The location of the display panel unit should be considered, after taking various functions of the optical viewer instrument with the digital camera into consideration. Namely, the display panel unit should be located at a handy position on the optical viewer instrument with the digital camera.

When the optical viewer instrument with the digital camera has the display panel unit, it is necessary to arrange a display selection switch on a casing of the optical viewer instrument with the digital camera to select either a display mode or a non-display mode, similar to a conventional digital camera. Namely, when the display mode is selected by turning ON the display selection switch, an object to be photographed is displayed as a motion picture on the display panel unit. When the non-display mode is selected by turning OFF the display selection switch, the display of the motion picture on the display panel unit is cancelled.

The optical viewer instrument with the digital camera is different from the conventional digital camera in that the former is utilized as a usual viewer instrument, such as a binocular telescope, a single telescope and so on. Therefore, the optical viewer instrument with the digital camera is frequently carried in an exposed manner being uncovered from a cover case, and thus it is often the case that the display selection switch will be inadvertently operated. When the display selection switch is inadvertently turned ON, batteries, loaded in the optical viewer instrument with the digital camera, will unnecessary run down.

Further, there is known another type of binocular telescope containing a camera, in which an objective lens system, included in one of both the telescopic lens systems, is utilized as a part of the photographing lens system.

In particular, each of the telescopic lens systems includes an objective lens system, an erecting prism system, and an ocular lens system. A half mirror is incorporated in one of the telescopic lens systems so as to be disposed between the objective lens system and the erecting prism system to define an angle of 45° with respect to the optical axis of the telescopic lens system concerned. A light beam, made incident on the objective lens system, is divided into two parts by the half mirror. Namely, part of the light beam passes through the half mirror toward the ocular lens system, and the remaining part of the light beam is reflected by the half mirror so as to be introduced in the photographing lens system.

Due to this arrangement, this type of binocular telescope with a camera may be more compact in comparison to the binocular telescope with a camera, disclosed in the Publication (KOKAI) No. 6-2330. Nevertheless, it is disadvantageous in that the amount of the light that is incident on the photographing lens system is diminished.

SUMMARY OF THE INVENTION

Therefore, an object of the invention is to provide an optical viewer instrument containing a digital camera, comprising a display panel unit for monitoring an object to be photographed, in which the display panel unit is located such that the optical viewer instrument with the digital camera is handy.

Another object of the invention is to provide an optical viewer instrument with a digital camera of the aforesaid type, which can be compactly arranged without unreasonable bulkiness.

According to the present invention, an optical viewer instrument with a photographing function comprises a telescopic optical system for observing an object, and the telescopic optical system includes a first part and a second part which are relatively and translationally movable with respect to each other. A digital camera system includes a photographing optical system and an image sensor which are associated with each other such that the object is formed as a photographic image on a light-receiving surface of the image sensor through the photographing optical system. A casing houses the telescopic optical system and the digital camera system, and a manually-operable rotary wheel is provided in the casing such that a portion of the rotary wheel is exposed to the outside through an opening formed in the casing. A focussing mechanism is associated with the telescopic optical system such that a rotational movement of the rotary wheel is converted into a relatively-translational movement between the two parts of the telescopic optical system to bring the object into focus through the telescopic optical system. A display panel unit for displaying the object to be photographed by the digital camera system on a display screen thereof is mounted on the casing so as to be movable between a retracted position where the display screen of the display panel unit is close to a wall surface of the casing and a display position where the display screen of the display panel unit is directed to the side of the ocular optical system of the telescopic optical system. The rotary wheel is arranged such that the exposed portion of the manually-operable rotary wheel is hidden behind the display panel unit when being at the retracted position.

Preferably, the first part of the telescopic optical system is provided at an immovable position in the casing, and the second part of the telescopic optical system is translationally movable with respect to the first part of the telescopic optical system, such that the second part of the telescopic optical system is completely retracted in the casing when being closest to the first part of the telescopic optical system. Also, preferably, the display panel unit is disposed on the top wall of the casing.

A display selection switch may be provided on the casing to select whether the object to be photographed should be displayed as a motion picture on the display screen of the display panel unit, and the rotary wheel is arranged such that the display selection switch is hidden together with the rotary wheel behind the display panel unit when being at the retracted position.

Preferably, the display panel unit has a projection integrally extending therefrom, and the display selection switch is hidden behind the projection when the display panel unit is at the retracted position.

Preferably, the rotary wheel is integrally formed around a tubular shaft, and the photographing optical system is housed in the tubular shaft. More preferably, the photographing optical system is relatively and translationally movable in the tubular shaft with respect to the image sensor, and a focussing mechanism for the photographing optical system is provided between the tubular shaft and the photographing optical system to convert the rotational movement of the tubular shaft into a translational movement of the photographing optical system to focus the object on the light-receiving surface of the image sensor.

There may be a first telescopic optical system and a second telescopic optical system as a substitute for the aforesaid telescopic optical system. Each of the first and second telescopic optical systems includes a first part and a second part which are relatively and translationally movable with respect to each other, the object is observed through both the first and second telescopic optical systems. In this case, the casing includes two casing sections movably engaged with each other, and the respective first and second telescopic optical systems are assembled in the casing sections such that the distance between the optical axes of the first and second telescopic optical systems is adjustable by relatively moving one of the casing sections with respect to the remaining casing section. Preferably, one of the casing sections is slidably engaged with the remaining casing section such that the optical axes of the first and second telescopic optical systems are movable in a common geometric plane by relatively sliding one of the casing sections with respect to the remaining casing section.

Preferably, the respective first parts of the first and second telescopic optical systems are provided at immovable positions in the casing sections, and the respective second parts of the telescopic optical systems are translationally movable with respect to the first parts of the telescopic optical systems, such that the respective second parts of the telescopic optical systems are completely retracted in the casing sections when being closest to the first parts of the telescopic optical systems.

BRIEF DESCRIPTION OF THE DRAWINGS

The objects and other objects of the invention will be better understood from the following descriptions, with reference to the accompanying drawings, in which:

FIG. 12 is a plan view, similar to FIG. 11, in which the LCD panel unit is positioned at a display position; and FIG. 13 is a plan view, similar to FIG. 12, showing a modification of the second embodiment shown in FIGS. 11 and 12.

DESCRIPTION OF THE PREFERRED EMBODIMENTS

Figure 1:
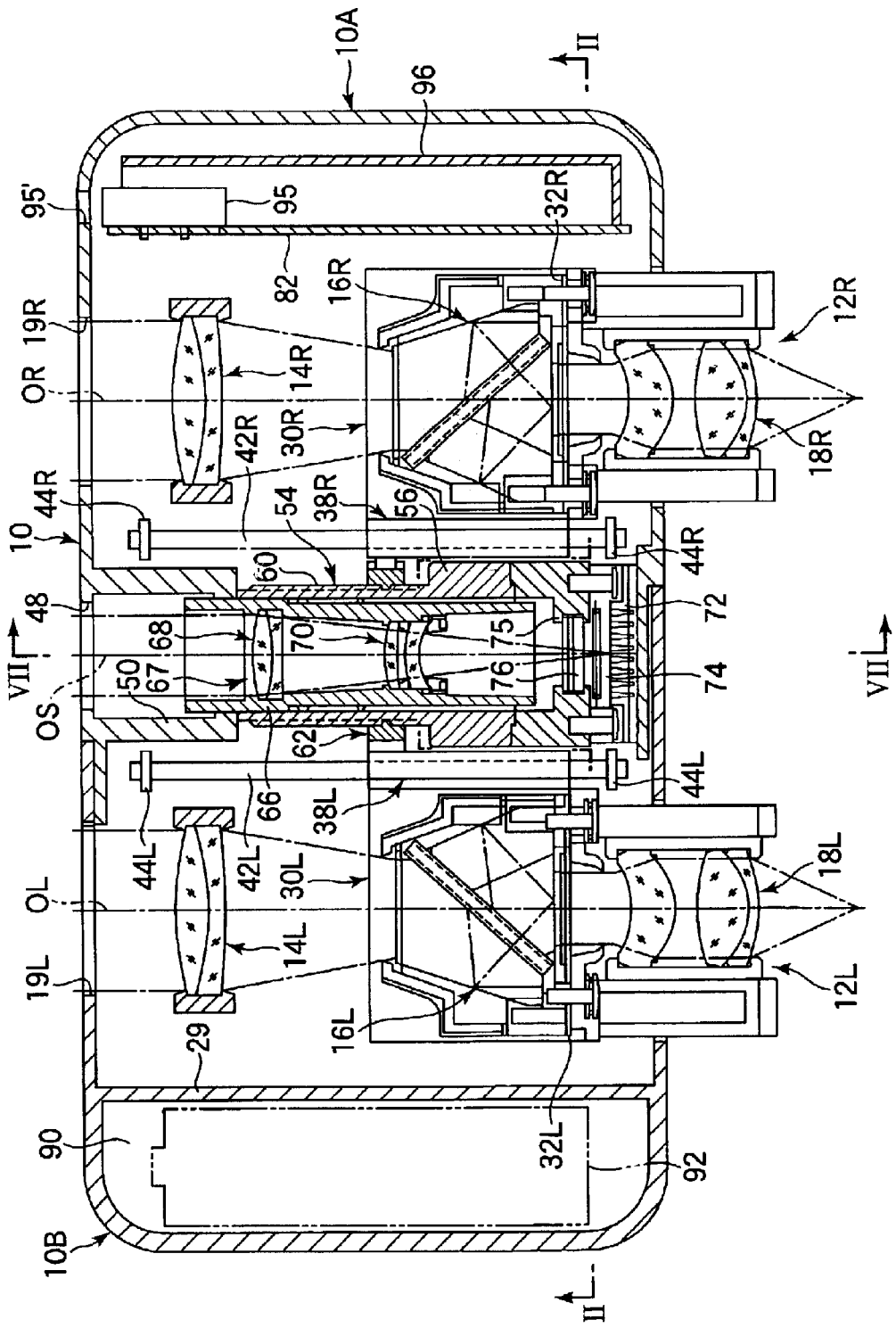
FIG. 1 is a cross-sectional plan view of a first embodiment of a binocular telescope containing a digital camera according to the present invention.
Figure 2:
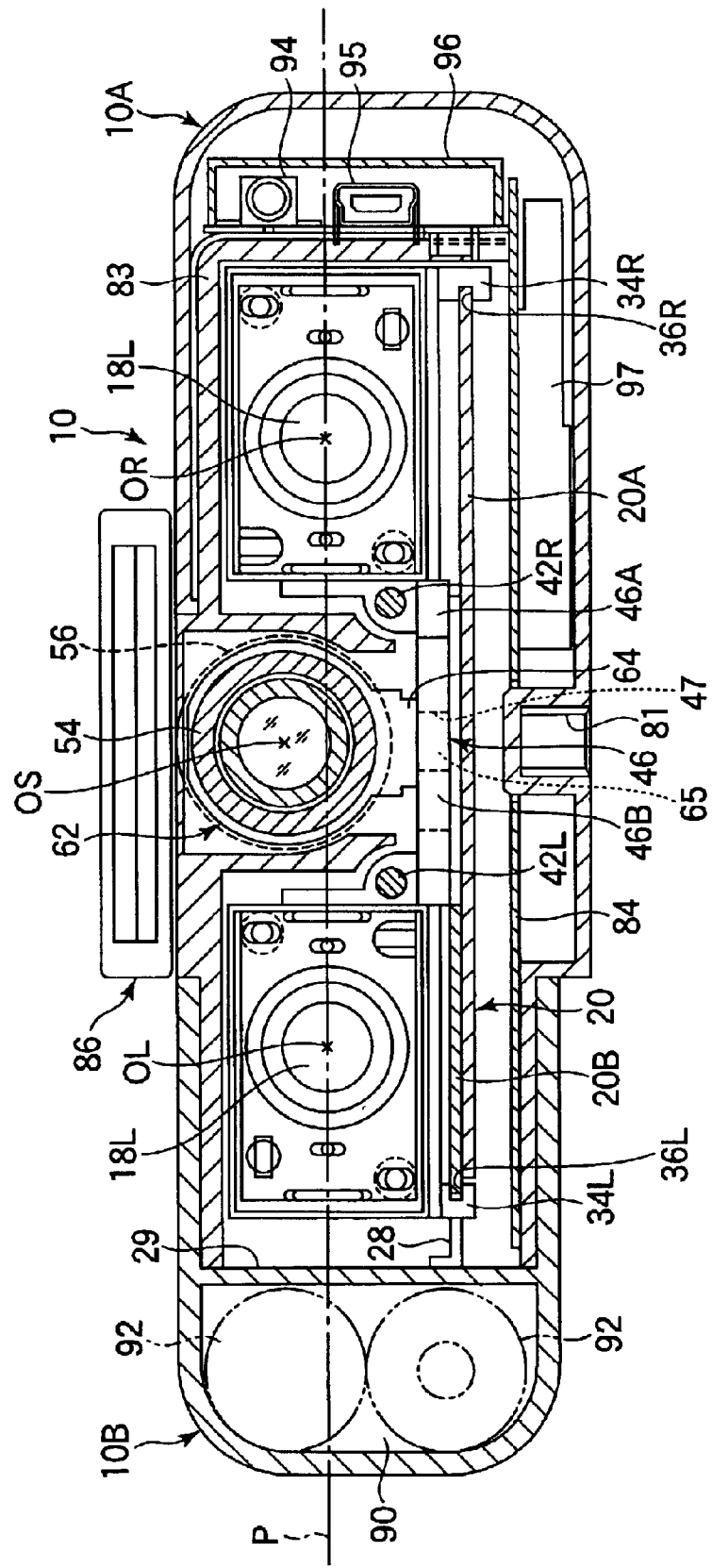
FIG. 2 is a cross-sectional view taken along line II—II of FIG. 1, in which a movable casing section is shown at a retracted position with respect to a main casing section.

FIG. 1 shows an inner arrangement of a first embodiment of a binocular telescope containing a digital camera, constituted according to the present invention, and FIG. 2 shows a cross-section taken along line II—II of FIG. 1.

The binocular telescope with the digital camera comprises a casing 10 including a main casing section 10A and a movable casing section 10B, and a pair of telescopic lens systems 12R and 12L, housed in the casing 10, which optically identical to each other. The respective telescopic lens system 12R and 12L are provided for the right and left eyes of a human, and are symmetrically arranged with respect to a middle line therebetween.

The right telescopic lens system 12R is assembled in the main casing section 10A, and includes an objective lens system 14R, an erecting prism system 16R, and an ocular lens system 18R. A front wall of the main casing section 10A is formed with a window 19R, which is aligned with the objective lens system 14R of the right telescopic lens system.

The left telescopic lens system 12R is assembled in the movable casing section 10B, and includes an objective lens system 14L, an erecting prism system 16L, and an ocular lens system 18L. A front wall of the movable casing section 10B is formed with a window 19L, which is aligned with the objective lens system 14L of the left telescopic lens system.

The movable casing section 10B is slidably engaged with the main casing section 10A, such that they are relatively moved from each other. Namely, the movable casing section 10B can be moved in relation to the main casing section 10A between a retracted position as shown in FIG. 2 and a maximum-extended position as shown in FIG. 3.

A suitable friction force acts on the sliding surfaces of both the casing sections 10A and 10B, and thus a certain extension force must be exerted on the movable casing section 10B before the movable casing section 10B can be extended from the main casing section 10A. Similarly, a certain extraction force must be exerted on the movable casing section 10B before the movable casing section 10B can be retracted onto the main casing section 10A. Thus, it is possible for the movable casing section 10B to hold or stay still at an optional position between the retracted position (FIG. 2) and the maximum-extended position (FIG. 3), due to the suitable friction force acting on the sliding surfaces of both the casing sections 10A and 10B.

Figure 3:
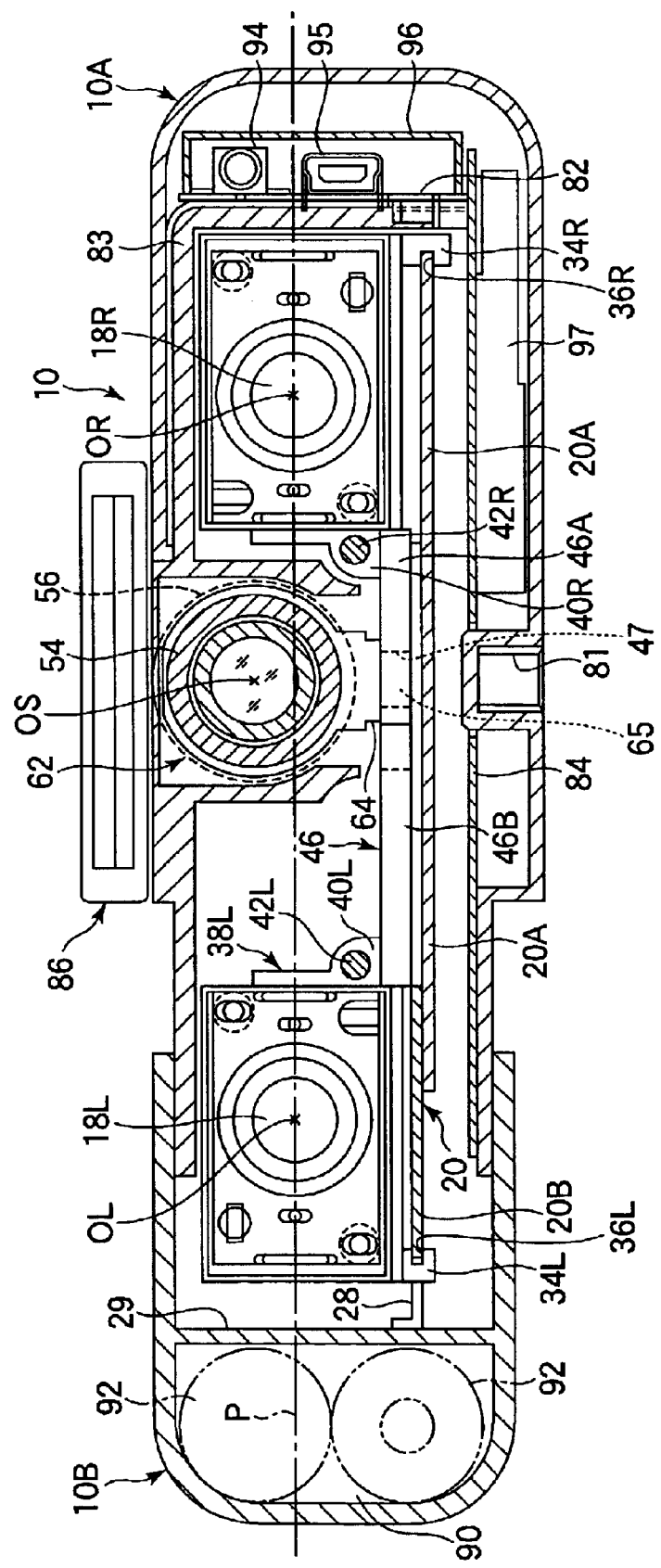
FIG. 3 is a cross-section view, similar to FIG. 2, in which the movable casing section is shown at an extended position with respect to the main casing section.

As is apparent from FIGS. 2 and 3, when the movable casing section 10B is extended from the main casing section 10A, the left telescopic lens system 12L is moved together with the movable casing section 10B, but the right telescopic lens system 12R stays in the main casing section 10A. Thus, by extending the movable casing section 10B from the main casing section 10A, it is possible to adjust a distance between the optical axes OR and OL of the right and left telescopic lens systems 12R and 12L such that the distance can coincide with an interpupillary distance of a user. Namely, it is possible to perform the interpupillary adjustment by relatively sliding the movable casing section 10B in relation to the main casing section 10A.

In this embodiment, the objective lens system 14R of the right telescopic lens system 12R is housed at a fixed position with respect to the main casing section 10A, but both the erecting prism system 16R and the ocular lens system 18R are movable back and forth with respect to the objective lens system 14R, whereby an object to be observed through the right telescopic lens system 12R is brought into focus. Similarly, the objective lens system 14L of the left telescopic lens system 12L is housed at a fixed position with respect to the movable casing section 10B, but both the erecting prism system 16L and the ocular lens system 18L are movable back and forth with respect to the objective lens system 14L, whereby an object to be observed through the left telescopic lens system 12L is brought into focus.

Figure 4:
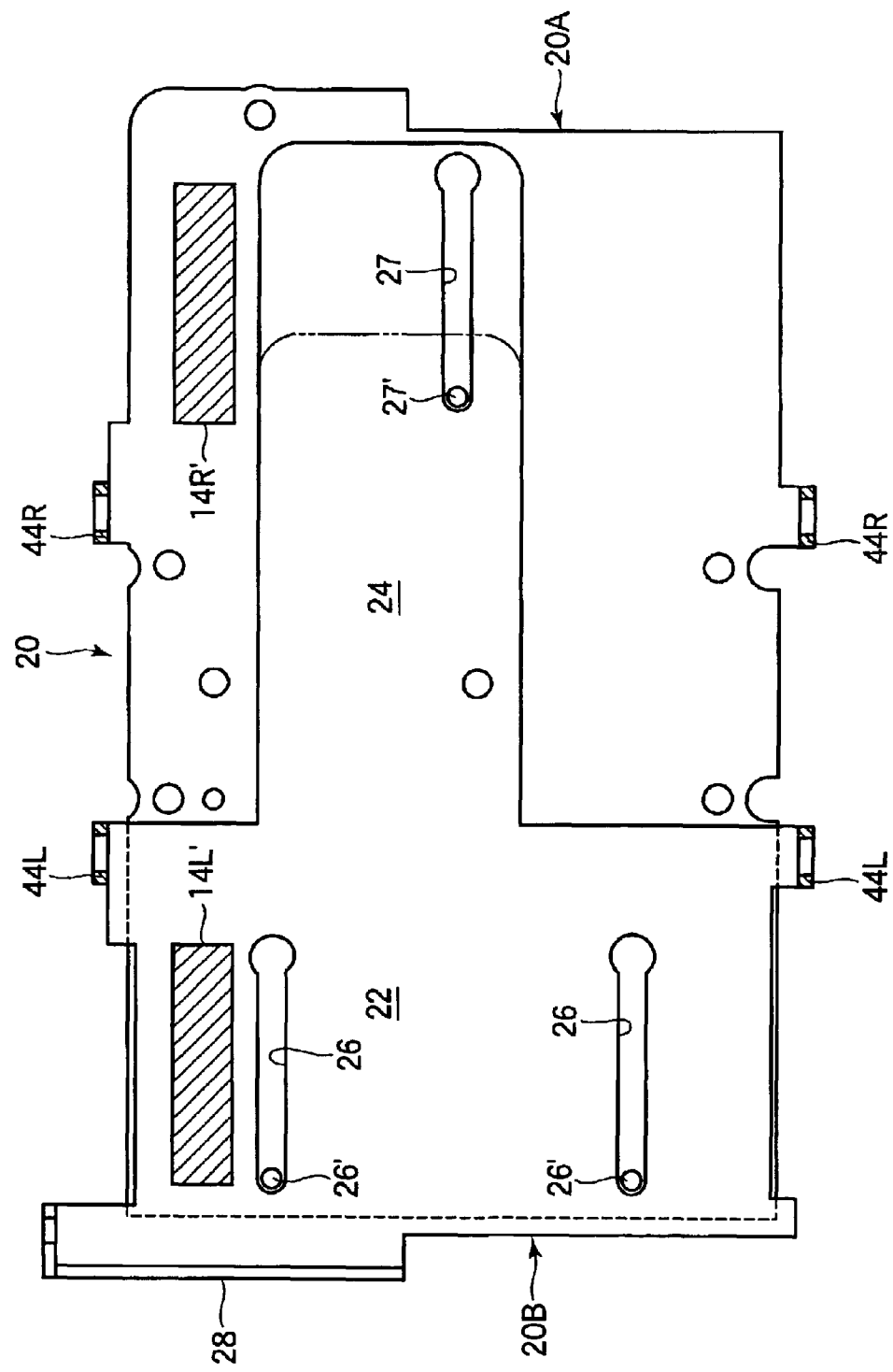
FIG. 4 is a plan view of a support-plate assembly housed in a casing formed by the main and movable casing sections.

For the purpose of both the interpupillary adjustment and the focussing of the right and left telescopic lens systems 12R and 12L, the casing 10 is provided with a support-plate assembly 20, as shown in FIG. 4, and the right and left telescopic lens systems 12R and 12L are mounted on the support-plate assembly 20 in the manner stated in detail hereinafter. Note, in FIG. 1, although the support-plate assembly 20 is visible, it is not shown in order to avoid an overly complex illustration.

As shown in FIG. 4, the support-plate assembly 20 comprises a rectangular plate member 20A, and a slide plate member 20B slidably laid on the rectangular plate member 20A. The rectangular plate member 20A has a longitudinal length, and a lateral length shorter than the longitudinal length. The slide plate member 20B includes a rectangular section 22 having a width substantially equal to the lateral length of the rectangular plate member 20A, and a section 24 integrally extended from the section 22, both the sections 22 and 24 having a longitudinal length substantially equal to the longitudinal length of the rectangular plate member 20A.

The slide plate member 20B is provided with a pair of guide slots 26 formed in the rectangular section 22, and a guide slot 27 formed in the extended section 24. On the other hand, a pair of stub elements 26' and a stub element 27' are securely attached to the rectangular plate member 20A, such that the pair of stub elements 26' is slidably received in the pair of guide slots 26, and that the stub element 27' is slidably received in the guide slot 27. The guide slots 26 and 27 are extended so as to be parallel to each other, and each slot has a length corresponding to the movement distance of the movable casing section 10B between the retracted position (FIG. 2) and the maximum-extended position (FIG. 3).

As shown in FIGS. 2 and 3, the support-plate assembly 20 is arranged in the casing 10 so as to be spaced apart from the bottom of the casing 10. Although not shown, the rectangular plate member 20A is securely connected to the main casing section 10A in a suitable manner. The slide plate member 20B has a protrusion 28 integrally protruding from rectangular section 22, and the protrusion 28 is securely connected to a partition 29 provided in the movable casing section 10B, as shown in FIGS. 2 and 3. Thus, when the movable casing section 10B is moved with respect to the main casing section 10A, the slide plate member 20B can be moved together with the movable casing section 10B.

The objective lens system 14R of the right telescopic lens system 12R is securely fixed on the rectangular plate member 20A at a hatched area indicated by reference 14R', and the objective lens system 14L of the left telescopic lens system 12L is securely fixed on the rectangular section 22 of the slide plate member 20B at a hatched area indicated by reference 14L'.

Figure 5:
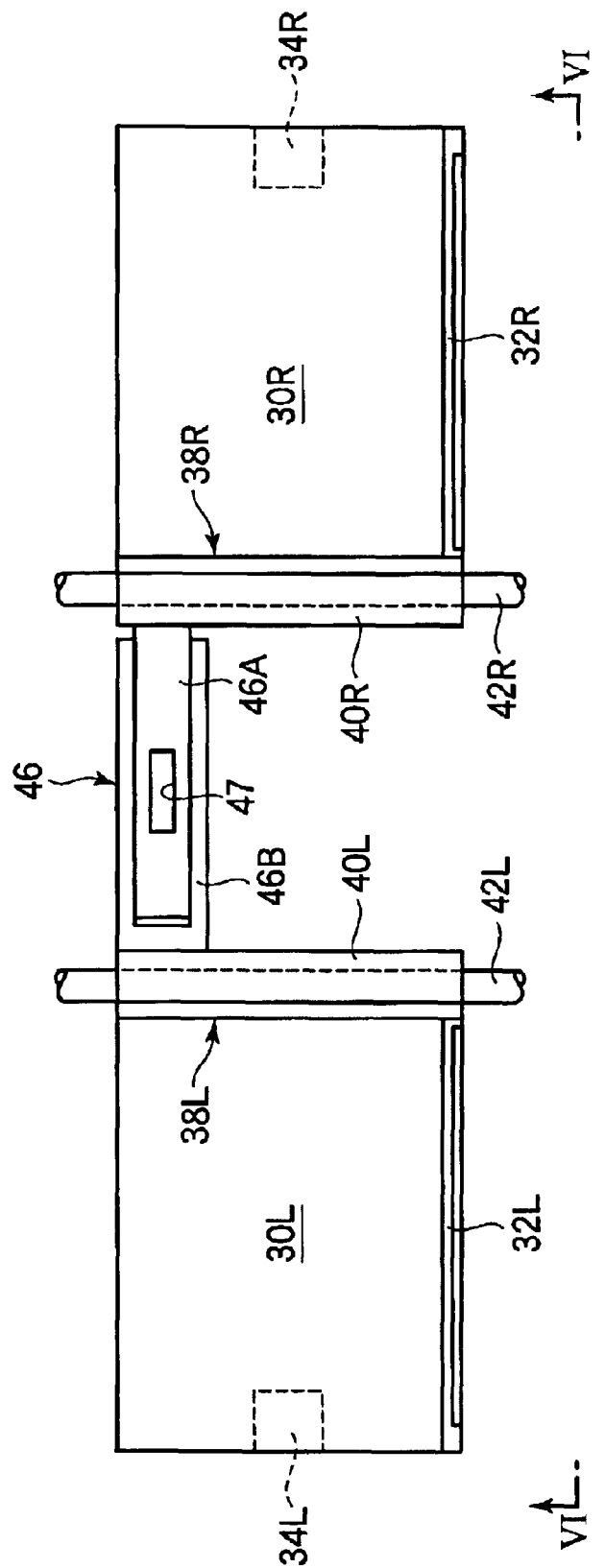
FIG. 5 is a plan view of the right and left mount plates arranged above the support-plate assembly.

FIG. 5 shows right and left mount plates 30R and 30L arranged above the support-plate assembly 20, and the respective erecting prism systems 16R and 16L are mounted on the right and left mount plates 30R and 30L, as shown in FIG. 1. Also, as is apparent from FIGS. 5 and 6, the respective right and left mount plates 30R and 30L have upright plates 32R and 32L provided along the rear side edges thereof, and the respective ocular lens systems 18R and 18L are attached to the upright plates 32R and 32L, as shown in FIG. 1.

The right mount plate 30R is movably supported by the rectangular plate member 20A such that both the erecting prism system 16R and the ocular lens system 18R are movable back and forth with respect to the objective lens system 14R. Similarly, the left mount plate 30L is movably supported by the slide plate member 20B such that both the erecting prism system 16L and the ocular lens system 18L are movable back and forth with respect to the objective lens system 14L.

Figure 6:
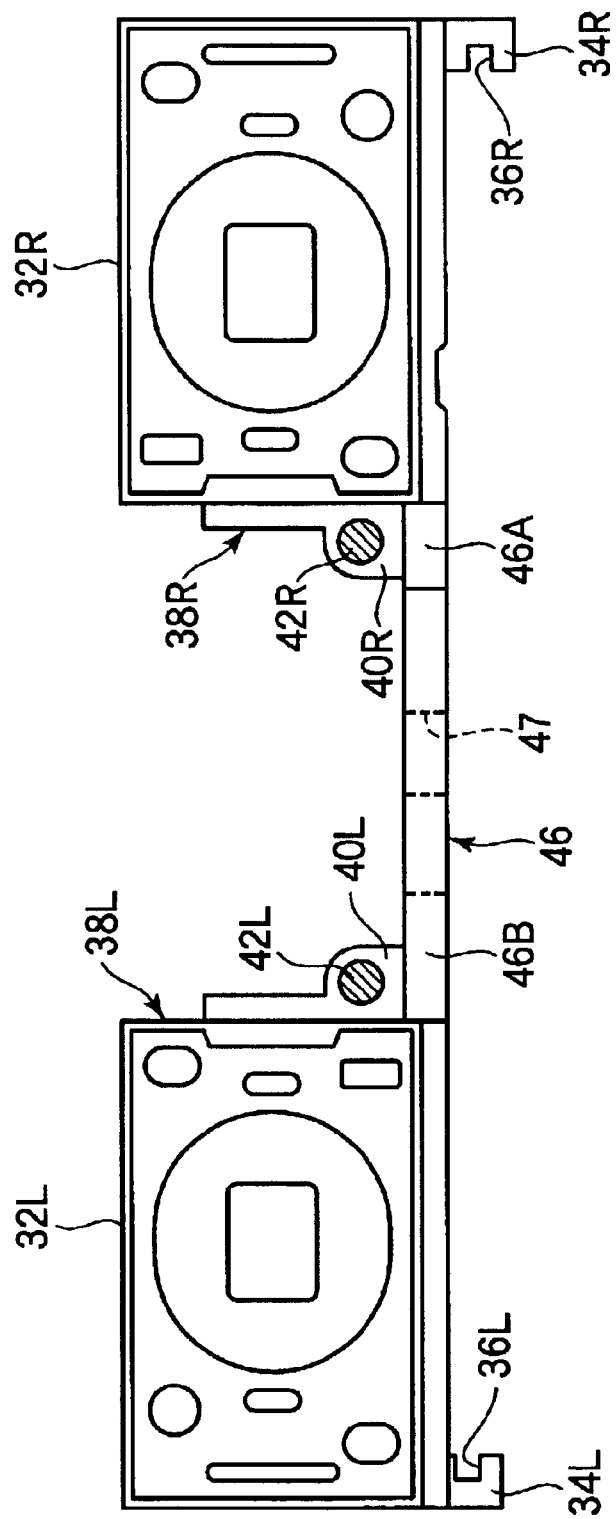
FIG. 6 is an elevational view observed along line VI—VI of FIG. 5.

In particular, the right mount plate 30R is provided with a guide shoe 34R secured to the underside thereof in the vicinity of the right side edge thereof, as shown in FIGS. 5 and 6. The guide shoe 34R is formed with a groove 36R (FIG. 6), which slidably receives a right side edge of the rectangular plate member 20A, as shown in FIGS. 2 and 3. Also, the right mount plate 30R has a side wall 38R provided along a left side edge thereof, and a lower portion of the side wall 38R is formed as a swollen portion 40R having a through bore for slidably receiving a guide rod 42R. The ends of the guide rod 42R are securely supported by a pair of fixture pieces 44R integrally protruding from the rectangular plate member 20A (FIGS. 1 and 4). Thus, the right mount plate 30R, carrying both the erecting prism system 16R and the ocular lens system 18R, is translationally movable back and forth with respect to the objective lens system 14R.

Similarly, the left mount plate 30L is provided with a guide shoe 34L secured to the underside thereof in the vicinity of the left side edge thereof, as shown in FIGS. 5 and 6. The guide shoe 34L is formed with a groove 36L (FIG. 6), which slidably receives a left side edge of the slide plate member 20B, as shown in FIGS. 2 and 3. Also, the left mount plate 30L has a side wall 38L provided along a right side edge thereof, and a lower portion of the side wall 38L is formed as a swollen portion 40L having a through bore for slidably receiving a guide rod 42L. The ends of the guide rod 42L are securely supported by a pair of fixture pieces 44L integrally protruding from the slide plate member 20B (FIGS. 1 and 4). Thus, the left mount plate 30L, carrying both the erecting prism system 16L and the ocular lens system 18L, is translationally movable back and forth with respect to the objective lens system 14L.

Note, as stated above, although the support-plate assembly 20 is not shown in FIG. 1, only the fixture pieces 44R and 44L are illustrated.

With the above-mentioned arrangement, it is possible to perform the interpupillary adjustment of the right and left telescopic lens systems 12R and 12L by moving the movable casing section 10B from and toward the main casing section 10A. Further, it is possible to perform the focussing of the right telescopic lens system 12R by translationally moving the mount plate 30R back and forth with respect to the objective lens system 14R, and it is possible to perform the focussing of the left telescopic lens system 12L by translationally moving the mount plate 30L back and forth with respect to the objective lens system 14L.

In order to simultaneously move the right and left mount plates 30R and 30L such that a distance between the right and left mount plates 30R and 30L is variable, the mount plates 30R and 30L are interconnected to each other by an expandable coupler 46.

In particular, as best shown in FIG. 5, the expandable coupler 46 includes a rectangular lumber-like member 46A, and a forked member 46B in which the lumber-like member 46A is slidably received. The lumber-like member 46A is securely attached to the underside of the swollen portion 40R of the side wall 38R at the forward end thereof, and the forked member 46B is securely attached to the underside of the swollen portion 40L of the side wall 38L at the forward end thereof. Both the members 46A and 46B have a length which is greater than the distance of movement of the movable casing section 10B, between its retracted position (FIG. 2) and its maximum extended position (FIG. 3). Namely, even though the movable casing section 10B is extended from the retracted position (FIG. 2) to the maximum extended position (FIG. 3), the slidable engagement is maintained between the members 46A and 46B. Thus, the simultaneous translational movement of both the mount plates 30R and 30L, and therefore, both the right optical system (16R, 18R) and the left optical system (16L, 18L), can be assured at all times.

Note, as best shown in FIG. 5, the lumber-like member 46A is formed with a rectangular bore 47, which is utilized for the purpose stated hereinafter.

Figure 7:
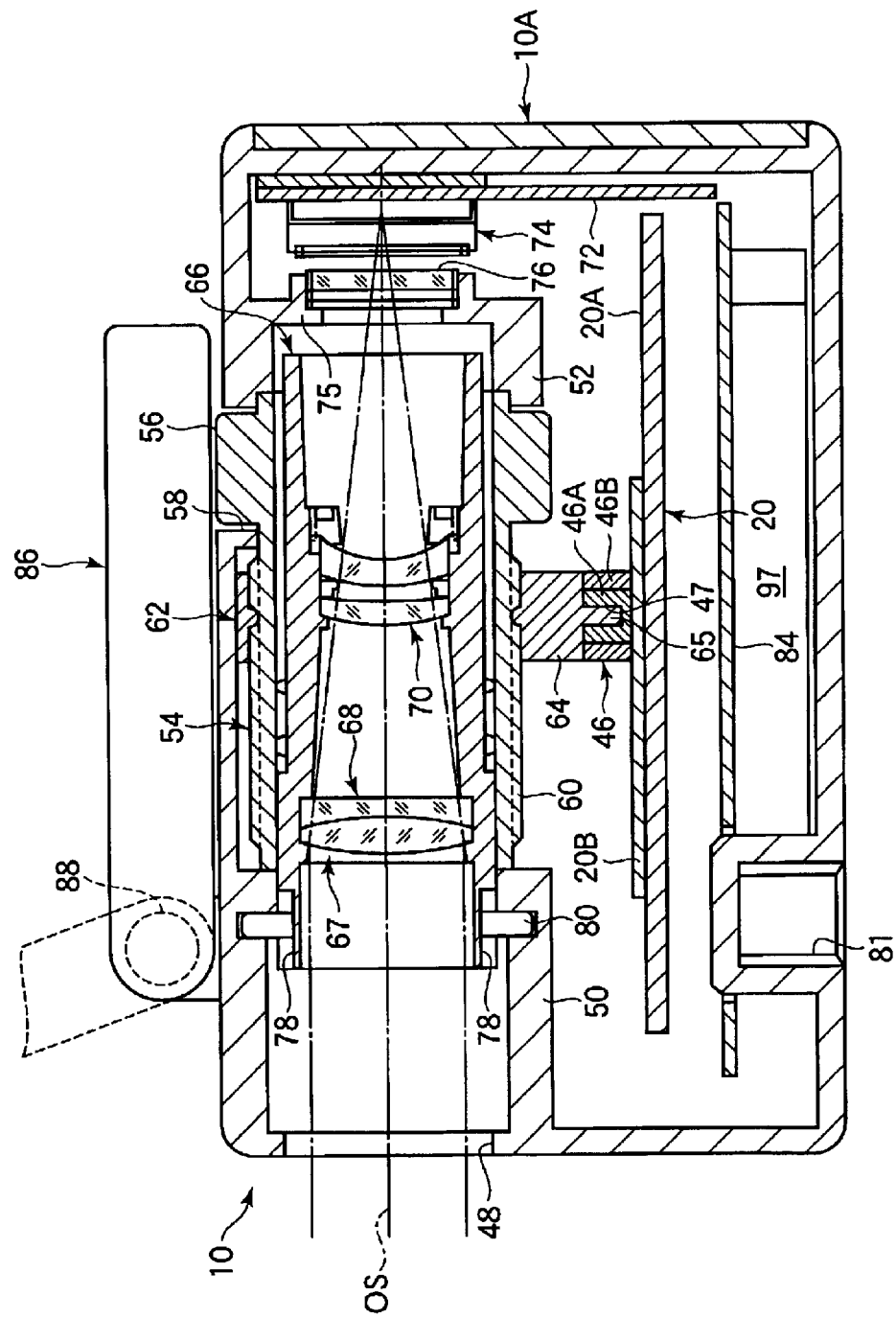
FIG. 7 is a cross-sectional view taken along line VII—VII of FIG. 1.

FIG. 7 shows a cross-section taken along line VII—VII of FIG. 1. As is apparent from FIGS. 1 and 7, the main casing section 10A has a circular window 48 formed in the front wall thereof, and the circular window 48 is at a center position of the front wall of the casing 10 when the movable casing section 10B is positioned at the retracted position (FIG. 2).

As shown in FIGS. 1 and 7, the main casing section 10A has an inner front sleeve member 50 integrally protruding from the inner wall surface of the front wall thereof to surround the circular window 48, and the inner front sleeve member 50 is integrated with the top wall of the main casing section 10A. Also, an inner rear sleeve member 52 is integrally suspended from the top wall of the main casing section 10A, and is aligned with the inner front sleeve member 50.

A tubular shaft 54 is rotatably provided between and supported by the inner front and rear sleeve members 50 and 52, and has a rotary wheel 56 integrally formed therewith. As shown in FIG. 7, a rectangular opening 58 is formed in the top wall of the main casing section 10A, a portion of the rotary wheel 56 is exposed to the outside through the rectangular opening 58. Thus, it is possible to rotate the tubular shaft 54 by manually driving the exposed portion of the rotary wheel 56 with a user's finger.

The tubular shaft 54 has a male screw 60 formed around the outer peripheral wall surface thereof between the front end thereof and the rotary wheel 56, and an annular member 62 is threaded onto the male screw 60 of the tubular shaft 54. As shown in FIGS. 2, 3, and 7, the annular member 62 has a radial extension 64 integrally formed therewith, and a rectangular projection 65 is integrally projected from the radial extension 64. The rectangular projection 65 is inserted and fitted into the rectangular bore 47 formed in the lumber-like member 46A of the expandable coupler 46.

With the above-mentioned arrangement, while the tubular shaft 54 is rotated by manually driving the rotary wheel 56, the annular member 62 is moved along the longitudinal central axis of the tubular shaft 54, resulting in the simultaneous translational movement of both the mount plates 30A and 30B, and therefore, both the right optical system (16R, 18R) and the left optical system (16L, 18L). Namely, the tubular shaft 54 and the annular member 62, which are threadedly engaged with each other, form a movement-conversion mechanism for converting the rotational movement of the rotary wheel 56 into the translational movement of both the right optical system (16R, 18R) and the left optical system (16L, 18L), and the movement-conversion mechanism is utilized as a focussing mechanism for both the right and left telescopic lens systems 12R and 12L.

In this embodiment, the right and left telescopic lens systems 12R and 12L are optically designed such that an object, which is situated more than 40 meters ahead of the digital camera, is brought into focus when both the erecting prism system (16R, 16L) and the ocular lens system (18R, 18L) are closest to the corresponding objective lens system (14R, 14L). Thus, before a near object, which is situated less than 40 meters ahead of the digital camera, can be brought into focus, it is necessary to move both the erecting prism system (16R, 16L) and the ocular lens system away from the corresponding objective lens system (14R, 14L). When both the erecting prism system (16R, 16L) and the ocular lens system are farthest from the corresponding objective lens system (14R, 14L), a near object, which is situated, for example, 2.0 meter ahead of the digital camera, can be brought into focus.

When an object at infinity is brought into focus through both the right and left telescopic lens systems 12R and 12L, i.e. when both the erecting prism system (16R, 16L) and the ocular lens system (18R, 18L) are closest to the corresponding objective lens system (14R, 14L), the respective ocular lens systems 18R and 18L are completely retracted in the casing sections 10R and 10L, and thus the binocular telescope with the digital camera becomes most compacted. This compacted state is suited to a hand-carrying of the binocular telescope with the digital camera.

As best shown in FIGS. 1 and 7, a lens barrel 66 is provided within the tubular shaft 54, and a photographing lens system 67 including a first lens system 68 and a second lens system 70 is held in the lens barrel 66. On the other hand, an image-sensor control circuit board 72 is securely attached to the inner wall surface of the rear wall of the main casing section 10A, and a CCD image sensor 74 is mounted to the image-sensor control circuit board 72 such that a light-receiving surface of the CCD image sensor 74 is aligned with the photographing lens system 67 held in the lens barrel 66. The inner rear sleeve member 52 has an inner annular flange 75 formed at the rear end thereof, and an optical low-pass filter 76 is fitted into the inner annular flange 75. In short, the photographing lens system 67, the CCD image sensor 74, and the optical low-pass filter 76 form a digital camera, and an object to be photographed is focussed on the light-receiving surface of the CCD image sensor 74 through the photographing lens system 67 and the optical low-pass filter 76.

In this embodiment, since the photographing lens system 67 is housed in the tubular shaft having the rotary wheel 56, it is possible to compactly constitute the binocular telescope with the camera. In particular, in general, a binocular telescope needs a focussing rotary wheel, having a relatively large diameter, for focussing a pair of telescopic lens systems, and the focussing rotary wheel is mounted on a shaft. According to this embodiment, since such a shaft is formed as a tubular shaft for accommodating the photographing lens system 67, it is possible to incorporate the photographing lens system in a binocular telescope without a considerable bulkiness thereof.

Before the nearest object, which is situated 2.0 meters ahead of the digital camera, can be photographed as a focussed image, similar to a case of a usual digital camera, it is necessary to incorporate a focussing mechanism into the photographing lens system 67. Further, the focussing mechanism for the photographing lens system 67 should be operationally connected and linked to the focussing mechanism for the right and left telescopic lens systems 12R and 12L, because the telescopic lens systems 12R and 12L are utilized as an optical view finder system for the contained digital camera. Namely, when an object is observed as a focussed image through both the right and left telescopic lens systems 12R and 12L, the observed object should be focussed on the light-receiving surface of the CCD image sensor 74 through the photographing lens system 67.

To this end, respective female and male screws are formed around the inner peripheral wall surface of the tubular shaft 54 and the outer peripheral wall surface of the lens barrel 66, such that the lens barrel 66 is in threaded-engagement with the tubular shaft 54. The front end portion of the lens barrel 66 is inserted into the inner front sleeve member 50, and a pair of key grooves 78 is diametrically formed in the front end portion of the lens barrel 66, each of the key grooves 78 extending over a predetermined distance measured from the front end edge thereof. On the other hand, a pair of bores is diametrically formed in the inner wall of the inner front sleeve member 50, and two pin elements 80 are planted in the bores in pair so as to be engaged in the key grooves 78, as shown in FIG. 7, thereby preventing a rotational movement of the lens barrel 55.

Thus, when the tubular shaft 54 is rotated by manually driving the rotary wheel 56, the lens barrel 66 is translationally moved along the optical axis OS of the photographing lens system 67 due to the threaded-engagement of the tubular shaft 54 with the lens barrel 66. Namely, the female and male screws, which are formed around the inner peripheral wall surface of the tubular shaft 54 and the outer peripheral wall surface of the lens barrel 66, constitute a movement-conversion mechanism for converting the rotational movement of the rotary wheel 56 into the translational movement of the lens barrel 66, and this movement-conversion mechanism is utilized as the focussing mechanism for the photographing lens system 67.

The male screw 60, formed around the outer peripheral surface of the tubular shaft 54, is formed as a reversed screw with respect to the female screw formed around the inner peripheral surface of the tubular shaft 54. Accordingly, when both the erecting prism system (16R, 16L) and the ocular lens system (18R, 18L) are moved rearward, away from the corresponding objective lens system (14R, 14L) by manually driving the rotary wheel 56, the lens barrel 66 is moved forward, away from the CCD image sensor 74. Thus, when the rearward movement of the both the erecting prism system (16R, 16L) and the ocular lens system (18R, 18L) are performed so as to bring a near object into focus in the telescopic lens system (12R, 12L), it is possible to focus the observed near object on the light-receiving surface of the CCD image sensor 74 due to the forward movement of the lens barrel 66, and therefore, the photographing lens system 67.

Note, of course, the male screw 60, formed around the outer peripheral surface of the tubular shaft 54, exhibits a screw pitch, which is determined in accordance with the optical characteristics of the right and left telescopic lens systems 12R and 12L, and the female screw, formed around the inner peripheral surface of the tubular shaft 54, exhibits a screw pitch, which is determined in accordance with the optical characteristics of the photographing lens system 67.

As is apparent from the foregoing, in this embodiment, the binocular telescope with the digital camera features the slidable casing 10 for the purpose of interpupillary adjustment of the right and left telescopic lens systems 12R and 12L. In particular, the optical axes OR and OL of the right and left telescopic lens systems 12R and 12L are parallel to each other, and are parallel to the optical axis OS of the photographing lens system 67. The optical axes OR and OL of the right and left telescopic lens systems 12R and 12L define a geometric plane P (FIGS. 2 and 3), and the casing sections 10A and 10B are slidably engaged with each other such that the optical axes OR and OL are movable in the common geometric plane P by relatively sliding one of the casing sections 10A and 10B with respect to the remaining casing section, for the purpose of the interpupillary adjustment of the right and left telescopic lens systems 12R and 12L.

As shown in FIGS. 2, 3, and 7, a female-threaded bore 81 is formed in the bottom wall of the main casing section 10A, and is used to mount the binocular telescope with the digital camera on a tripod head. Namely, when the binocular telescope with the digital camera is mounted on the tripod head, the female-threaded bore 81 is threadedly engaged with a male screw of the tripod head. As is apparent from FIG. 2, when the movable casing section 10B is at the retracted position, the female-threaded bore 81 is positioned at a middle point of the retracted casing 10 and beneath the optical axis of the photographing lens system 67. Also, as is apparent from FIG. 7, the female-threaded bore 81 is contiguous with the front bottom edge of the main casing section 10A.

As shown in FIGS. 1, 2, and 3, an electric power source circuit board 82 is provided in the right end portion of the main casing section 10A, and is attached to a frame structure 83 securely housed in the main casing section 10A. Also, as shown in FIGS. 2, 3, and 7, a main control circuit board 84 is provided in the main casing section 10A, and is arranged beneath the support-plate assembly 20. Although not illustrated, the main control circuit board 84 is suitably and securely supported by the bottom of the main casing section 10A. Various electronic elements, such as a microcomputer, memory circuits, and so on, are mounted on the main control circuit board 84.

In this embodiment, as is apparent from FIGS. 2, 3, and 7, an LCD (Liquid Crystal Display) panel unit 86 is arranged on the top wall of the main casing section 10A, and has a rectangular and flat configuration. The LCD panel unit 86 is rotatably mounted on a pivot shaft 88 at a forward side edge, and the pivot shaft 88 is suitably supported by the top wall of the main casing section 10A, and extends along the top front edge thereof. Namely, the LCD panel unit 86 is rotatable around a longitudinal central axis of the pivot shaft 88, which is perpendicular to the optical axis of the photographing lens system 67.

The LCD panel unit 86 is usually positioned at a retracted position shown by a solid line in FIG. 7, such that the display screen of the LCD panel unit 86 is directed so as to face the top wall surface of the main casing section 10A. Thus, when the LCD unit 86 is positioned at the retracted position, it is impossible for a user or spectator to view the display screen of the LCD unit 86. When the LCD panel unit 86 is manually rotated from the retracted position to a display position as partially shown by the broken line in FIG. 7, the display screen 100 of the LCD panel unit 86 is directed to the side of the ocular lens systems 18R and 18L (i.e. a user's face side), and thus it is possible for the user or spectator to view the display screen of the LCD panel unit 86.

As shown in FIGS. 1, 2 and 3, the left end portion of the movable casing section 10B is partitioned by the partition 29, thereby defining a battery chamber 90 for receiving two batteries 92. The electric power source circuit board 82 is supplied with electric power from the batteries 92 through a flexible electric power supply cord (not shown), and then the image-sensor control circuit board 72, the main control circuit board 84, the LCD panel unit 86 and so on are supplied with electric powers from the electric power source circuit board 82 through flexible electric power supply cords (not shown).

As best shown in FIGS. 2 and 3, two connector terminals 94 and 95 are mounted on the electric power source circuit board 82, and are accessible from outside through two access openings formed in the front wall of the main casing section 10A. Note, in FIG. 1, only one of the two access openings, which is provided for the connector terminal 95, is indicated by reference 95'. In this embodiment, the connector terminal 94 is used as a video connector terminal for connecting the digital camera to a domestic TV set, and the connector terminal 95 is used as a USB (Universal Serial Bus) connector terminal for connecting the digital camera to a personal computer. As shown in FIGS. 1, 2, and 3, the electric power source circuit board 82 is covered together with the connector terminals 94 and 95, with an electromagnetic shielding 96 made of a suitable electric conductive material, such as copper, steel or the like.

As shown in FIGS. 2, 3, and 7, a suitable memory card driver, such as a CF (Compact Flash) card driver 97, is mounted on the underside of the main control circuit board 84, and is arranged in the space between the bottom wall of the main casing section 10B and the main control circuit board 84. A memory card or CF card is detachably loaded in the CF card driver 97.

Figure 8:
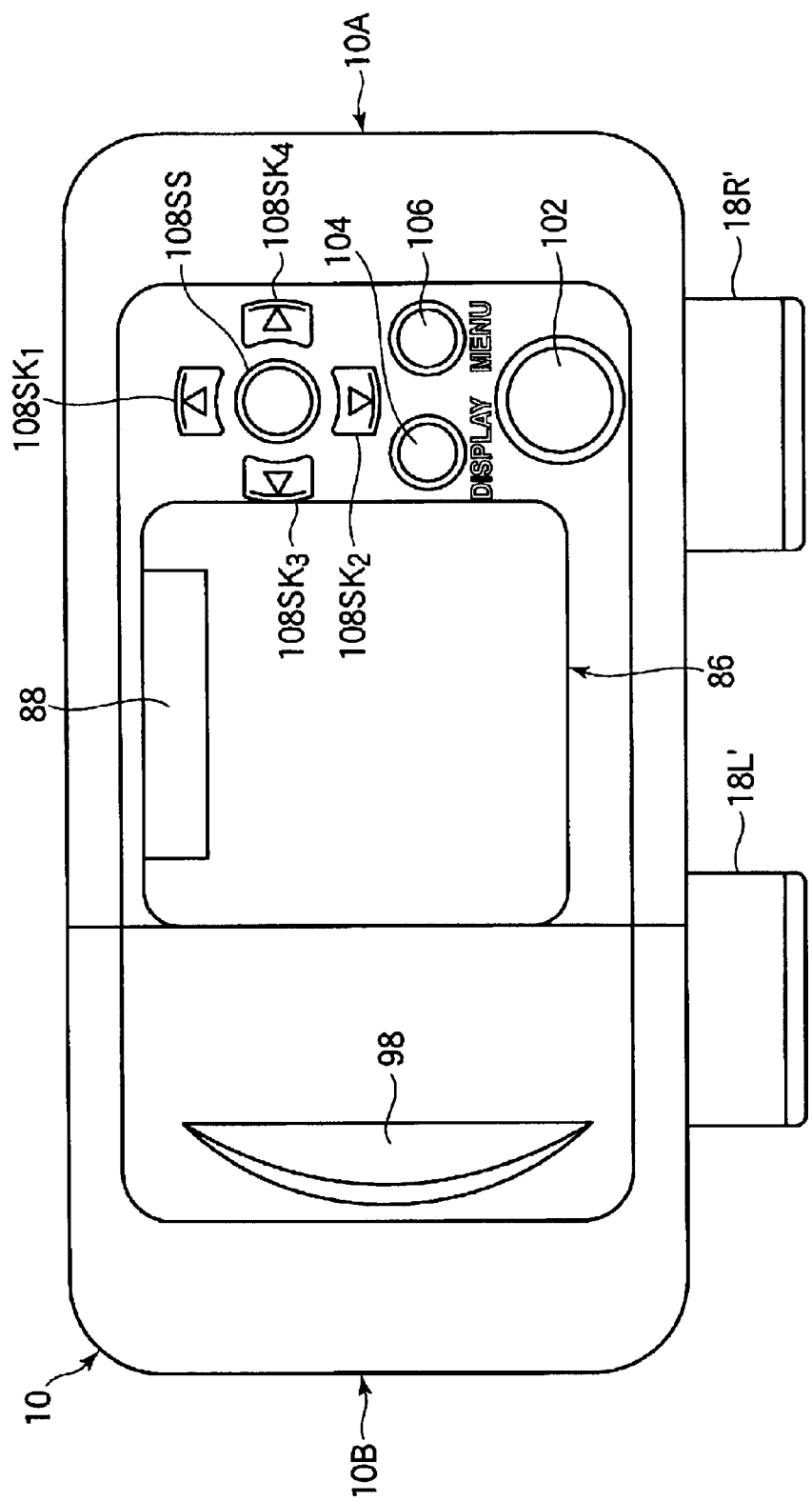
FIG. 8 is a plan view showing the appearance of the binocular telescope containing the digital camera, in which an LCD panel unit is positioned at a retracted position.
Figure 9:
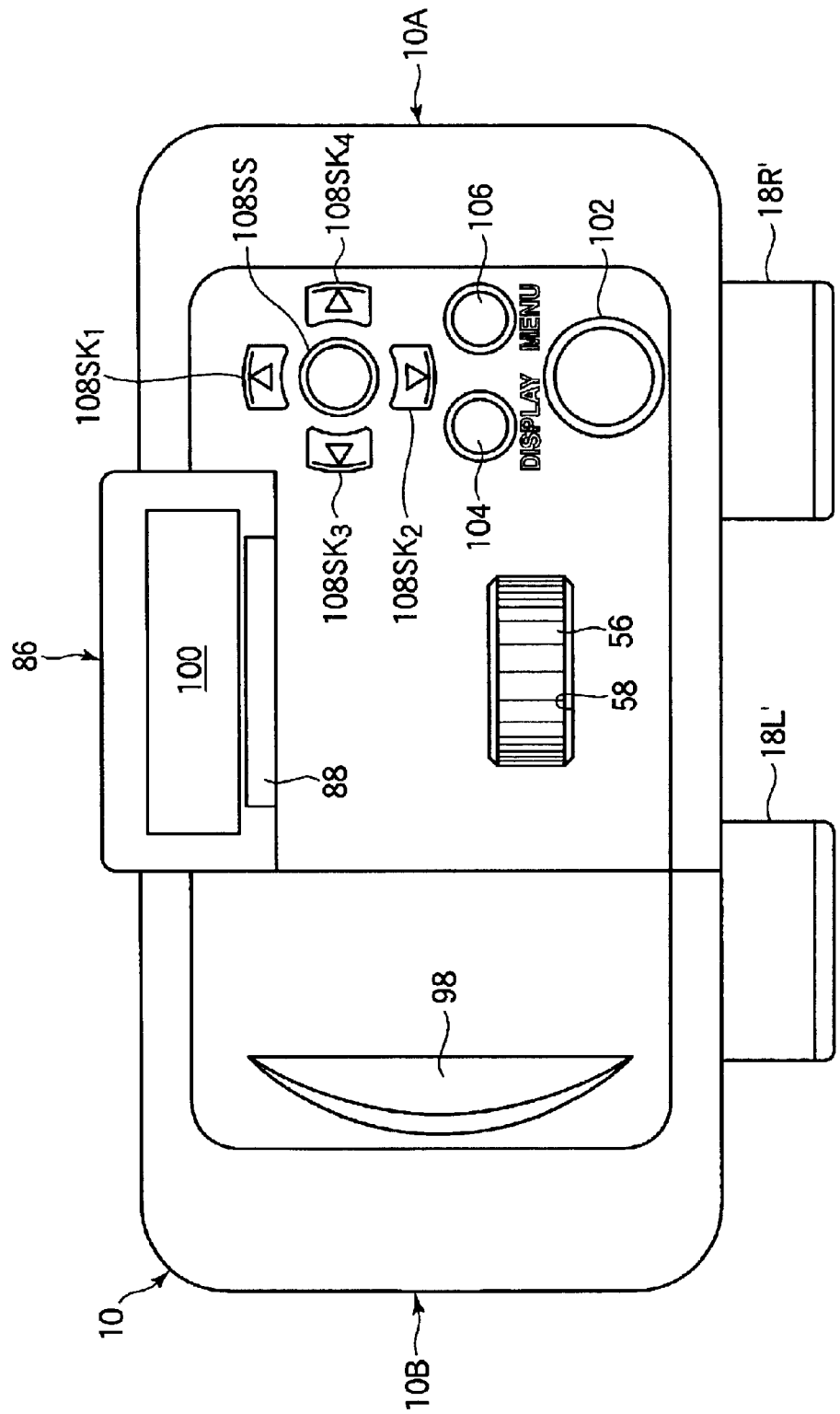
FIG. 9 is a plan view, similar to FIG. 8, in which the LCD panel unit is positioned at a display position.

Referring to FIGS. 8 and 9, the external appearance of the binocular telescope with the digital camera is shown as a plane view. In these drawings, respective references 18R' and 18L' indicate lens barrels for housing the ocular lens systems 18R and 18L, and the lens barrels 18R' and 18L' have a rectangular cross-sections. The respective lens barrels 18R' and 18L' are securely attached to and supported by the upright plates 32R and 32L of the right and left mount plates 30R and 30L (FIG. 6). Of course, as stated above, when both the erecting prism system (16R, 16L) and the ocular lens system (18R, 18L) are closest to the corresponding objective lens system (14R, 14L), the respective lens barrels 18R' and 18L' are completely retracted in the casing sections 10R and 10L, and thus the binocular telescope with the digital camera becomes most compact.

Also, reference 98 indicates a crescent-shaped shallow recess formed in the top wall of the movable casing section 10B, and the shallow recess 98 is provided for putting a user's fingers thereon when the movable casing section 10B is extended from the main casing section 10A, thereby facilitating the extension of the movable casing section 10B from the main casing section 10A.

In FIG. 8, the LCD panel unit 86 is shown at the retracted position. On the other hand, in FIG. 9, the LCD panel unit 86 is shown at the display position, and the display screen of the LCD panel unit 86 is indicated by reference 100.

As already stated, at the display position, since the display screen 100 of the LCD panel unit 86 is directed to the side of the ocular lens systems 18R and 18L, it is possible for the user or spectator to easily observe the display screen 100 of the LCD panel unit 86. Namely, during observation through the right and left telescopic lens systems 12R and 12L, by simply shifting the binocular telescope with the digital camera down a little, he or she can immediately observe the display screen 100 of the LCD panel unit 86. Also, the user can immediately return to the observing a subject through the right and left telescopic lens systems 12R and 12L by simply shifting the binocular telescope with the digital camera up a little. In short, it is possible for the user to immediately switch from observing a subject through the right and left telescopic lens systems 12R and 12L, to observing the subject on the display screen 100 of the LCD panel unit 86, and vice versa.

As is apparent from FIG. 8, when the LCD panel unit 86 is at the retracted position, the rotary wheel 56 is hidden behind the display panel unit 86, so that the rotary wheel 56 is prevented from being carelessly rotated while the binocular telescope with the digital camera (in which the lens barrels 18R' and 18L' are completely retracted in the casing 10) is being carried by hand. In other words, both the lens barrels 18R' and 18L' are prevented from being carelessly projected from the casing 10 while the binocular telescope with the digital camera is being carried by hand.

As shown in FIGS. 8 and 9, the binocular telescope with the digital camera is provided with a release switch 102, a display selection switch 104, a menu display switch 106, a set of four menu selection shift keys 108SK$_1$, 108SK$_2$, 108SK$_3$, and 108SK$_4$, and a menu settlement switch 108SS, which are suitably arranged on the top wall of the main casing section 10. Also, the binocular telescope with the digital camera is provided with a power ON/OFF switch, which may be arranged on the bottom wall of the main casing section 10A. These switches are connected to the microcomputer mounted on the main control circuit board 84.

The power ON/OFF switch (not visible) may be formed as a slide switch which is movable between an OFF-state position and an ON-state position. When the power ON/OFF switch is at the OFF-state position, the microcomputer is put into a sleep-mode state or minimum power-consumption state, in which it is monitored by the microcomputer whether only the power ON/OFF switch has been operated. Namely, all operations of the other switches except for the power ON/OFF switch are disabled in the sleep-mode state. When the power ON/OFF switch is moved from the OFF-state position to the ON-state position, it is monitored by the microcomputer whether each of the various switches has been operated.

The release switch 102 is formed as a self-return type depression switch, and comprises two switch elements associated with each other. One of the switch elements serves as a photometry switch element, and the other switch element serves as a release switch element. When the release switch 102 is half depressed, the photometry switch element is turned ON, whereby a photometry measurement is executed by the microcomputer. Also, when the release switch 102 is fully depressed, the release switch element 118B is turned ON, whereby a photographing operation is performed by the microcomputer.

The display selection switch 102 is formed as a self-return type depression switch. During the ON-state of the power ON/OFF switch, when the display selection switch 102 is turned ON, an object to be photographed is displayed as a motion picture on the display screen 100 of the LCD panel unit 86.

In particular, an object to be photographed is focussed on the light-receiving surface of the CCD image sensor 74 through the photographing lens system 67 and the optical low-pass filter 76. the focussed object image is converted into a frame of analog image-pixel signals by the CCD image sensor 74. While the display selection switch 104 is turned ON, a frame of thinned analog image-pixel signals is successively read from the CCD image sensor 74 at suitable time intervals, and the thinned analog image-pixel signals in each frame are suitably processed and converted into a frame of digital image-pixel signals. The frame of digital image-pixel signals is successively stored in a frame memory provided on the main control circuit board 84, and is read as a digital video signal from the frame memory. The digital video signal is converted into an analog video signal, and the object image is reproduced as a motion picture on the display screen 100 of the LCD panel unit 86 based on the video signal. Namely, it is possible for a user to monitor the object to be photographed on the LCD panel unit 86.

Note, of course, when the display selection switch 102 is turned OFF, the display of the motion picture on the display panel unit is cancelled.

When the release switch 102 is fully depressed to thereby turn ON the release switch element, a frame of full analog still image-pixel signals is read from the CCD image sensor 74 without being thinned, and is suitably processed and converted into a frame of full digital still image-pixel signals. Then, the frame of full digital still image-pixel signals is stored in the frame memory of the main control circuit board 84, and is subjected to suitable image processings. Thereafter, the processed digital still image-pixel signals for one frame are stored in the CF card memory, loaded in the CF card memory driver 97, in accordance with a given format.

The menu display switch 106 is also formed as a self-return type depression switch. During the ON-state of the power ON/OFF switch, when the menu display switch 106 is turned ON, various menu items are displayed on the display screen of the LCD panel unit 86, and any one of the menu items is indicated and selected by a cursor in which the indicated menu item is reversely displayed. The cursor can be shifted by selectively operating the four menu selection shift keys 108SK$_1$, 108SK$_2$, 108SK$_3$, and 108SK$_4$, whereby a desired menu item can be indicated and selected by the cursor. Thereafter, by depressing the menu settlement switch 108SS, the indicated and selected menu item is settled, and thus a process corresponding to the indicated and selected menu item is executed by the microcomputer.

For example, when a reproduction mode is selected from among the various menu items, and when the reproduction mode is settled by depressing the menu settlement switch 108SS, the digital still image-pixel signals in each frame are thinned and read from the CF card memory of the CF card memory driver 97, and are processed to thereby produce a video signal. Then, the photographed image is reproduced as a still image on the display screen 100 of the LCD panel unit 86, based on the video signal.

Optionally, the video signal may be fed to a domestic TV set through the video connector terminal 94, to reproduce the photographed image on a domestic TV set. Also, the digital still image-pixel signals in each frame may be fed from the CF memory card to a personal computer with a printer through the USB connector terminal 95, to thereby print the photographed image as a hard copy by using the printer. Of course, when the personal computer is provided with a CF memory card driver, the CF memory card, unloaded from the CF memory card driver 97, may be loaded in the CF memory card driver of the personal computer.

Figure 10:
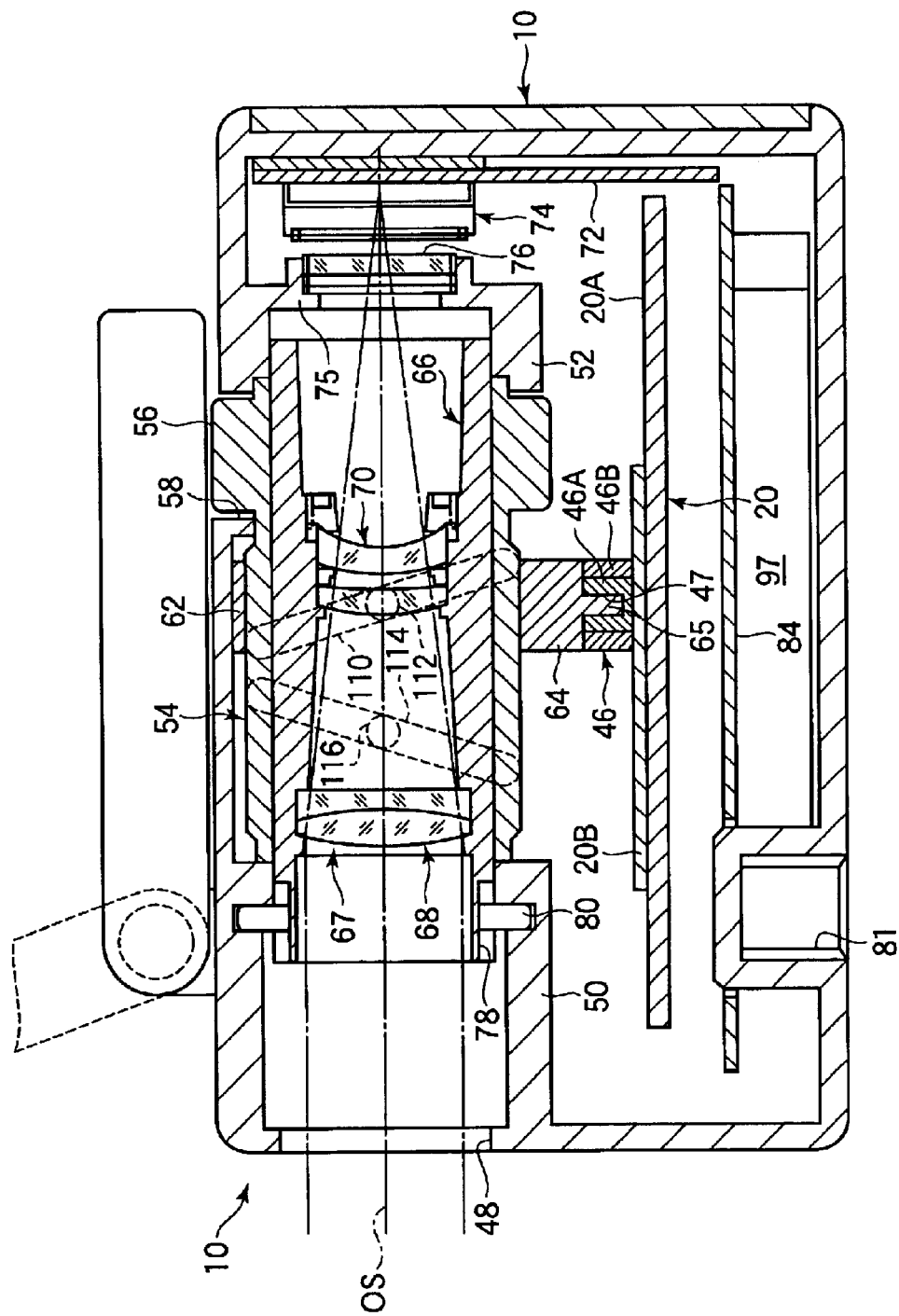
FIG. 10 is a cross-sectional view, similar to FIG. 7, showing a modification of the first embodiment shown in FIGS. 1 to 7.

FIG. 10, similar to FIG. 7, shows a modification of the aforesaid embodiment of the binocular telescope with the digital camera. Note, in FIG. 10, the features similar to those of FIG. 7 are indicated by the same references.

In the modified embodiment shown in FIG. 10, the focussing mechanism or movement-conversion mechanism for the right and left telescopic lens systems 12R and 12L is formed by a cam groove 110 formed around the outer wall surface of the tubular shaft 54, and a stub-like cam follower 112, which protrudes from the inner wall surface of the annular member 62, and which is engaged in the cam groove 110. Note, in FIG. 10, the cam groove 110 is shown by a broken line as being developed and spread over a plane. Thus, similar to the aforesaid embodiment, the rotational movement of the rotary wheel 56 is converted into a translational movement of both the right optical system (16R, 18R) and the left optical system (16L, 18L).

Also, in the modified embodiment, the focussing mechanism or movement-conversion mechanism for the photographing lens system 67 is formed by a cam groove 114 formed around the inner wall surface of the tubular shaft 54, and a stub-like cam follower 116, which protrudes from the outer wall surface of the lens barrel 66, and which is engaged in the cam groove 114. Note, similar to the cam groove 110, the cam groove 114 is shown by a broken line as being developed and spread over a plane. Thus, similar to the aforesaid embodiment, the rotational movement of the rotary wheel 56 is converted into a translational movement of the lens barrel 66.

As is apparent from FIG. 10, the cam grooves 110 and 114 are reversely oriented with respect to each other. Accordingly, when both the erecting prism system (16R, 16L) and the ocular lens system (18R, 18L) are moved rearward away from the corresponding objective lens system (14R, 14L) by manually driving the rotary wheel 56, the lens barrel 66 is moved forward away from the CCD image sensor 74. Thus, similar to the aforesaid embodiment, when the rearward movement of the both the erecting prism system (16R, 16L) and the ocular lens systems (18R, 18L) is performed so as to bring a near object into focus through the telescopic lens system (12R, 12L), it is possible to focus the observed near object on the light-receiving surface of the CCD image sensor 74 due to the forward movement of the photographing lens system 67.

In the aforesaid embodiment as shown in FIGS. 1 to 9, since the focusing mechanism or movement-conversion mechanism for both the right and left telescopic lens systems 12R and 12L is formed by the male and female screws, there is a linear relationship between the rotational movement of the rotary wheel 56 and the translational movement of both the right optical system (16R, 18R) and the left optical system (16L, 18L). Similarly, since the focussing mechanism or movement-conversion mechanism for the photographing lens system 67 is formed by the male and female screws, there is a linear relationship between the rotational movement of the rotary wheel 56 and the translational movement of the photographing lens system 67.

However, in reality, there is not necessarily a linear relationship between a focussing position of both the right optical system (16R, 18R) and the left optical system (16L, 18L) and a distance measured from the focussing position of both the right and left optical systems (16R; 18R, and 16L; 18L) to both the objective lens systems 14R and 14L. Similarly, there is not necessarily a linear relationship between a focussing position of the photographing lens system 67 and a distance measured from the focussing position of the photographing lens system 67 to the light receiving surface of the CCD image sensor 74.

Thus, before both the right and left optical systems (16R; 18R, and 16L; 18L) and the photographing lens system 67 can be precisely positioned at their respective focussing positions, each of the movement-conversion mechanisms should be formed by a cam groove (110, 114) and a cam follower (112, 116) as shown in FIG. 10, because it is possible to nonlinearly move both the right and left optical systems (16R; 18R, and 16L; 18L) and the photographing lens system 67 in relation to both the objective lens systems 14R and 14L and the CCD image sensor 74. In short, by using the cam grooves 110 and 114 and the cam followers 112 and 116, it is possible to precisely position both the right and left optical systems (16R; 18R, and 16L; 18L) and the photographing lens at their respective focussing positions.

Of course, since both the right and left telescopic lens systems 12R and 12L and the photographing lens system 67 have a certain amount of focal depth, there is no trouble in forming the corresponding movement-conversion mechanism with male and female screws. However, as an object to be focussed gets nearer to the binocular telescope with the digital camera, it is more difficult to linearly approximate a relationship between the focussing position of the optical system (16R; 18R; 16L; 18L or 67) and the corresponding distance. For example, when both the right and left telescopic lens systems 12R and 12L and the photographing lens system 67 are designed so that the nearest object, situated less than 1.0 meter ahead of the binocular telescope with the digital camera, can be focussed, it is impossible to linearly approximate a relationship between the focussing position of the optical system (16R; 18R; 16L; 18L or 67) and the corresponding distance. In this case, it is necessary to form the focussing mechanisms or movement-conversion mechanisms with the respective cam grooves 110 and 114 and the respective cam followers 112 and 116, as shown in FIG. 10.

Figure 11:
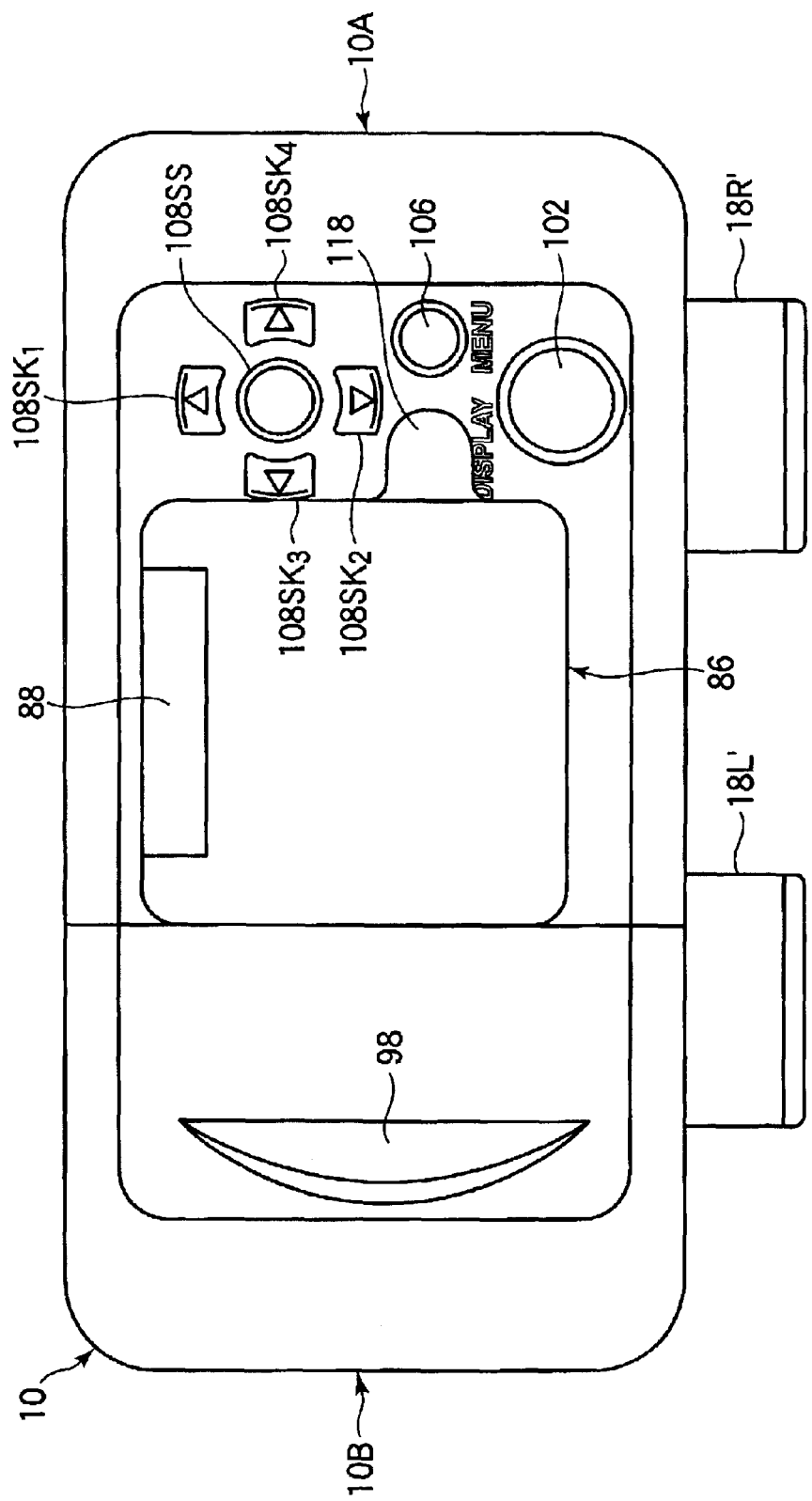
FIG. 11 is a plan view, similar to FIG. 8, showing a second embodiment of a binocular telescope containing a digital camera according to the present invention, in which an LCD panel unit is positioned at a retracted position.

With reference to FIGS. 11 and 12, similar to FIGS. 8 and 9, another embodiment of the binocular telescope with the digital camera according to the present invention is shown, and this embodiment is identical to the aforesaid embodiment except that the display panel unit 86 has an extension 118 integrally extending therefrom. Note, in FIGS. 11 and 12, the features similar to those of FIGS. 8 and 9 are indicated by the same references.

As is apparent from FIG. 11, when the LCD panel unit 86 is at the retracted position, the display selection switch 118 is hidden behind the projection 118. In other words, the display selection switch 118 is positioned beside the LCD panel unit 86 so as to be covered with the projection 118 when positioning the LCD panel unit 86 at the retracted position. Thus, although the binocular telescope with the digital camera is carried by a user, with the power ON/OFF switch being in the ON-state, the display selection switch 114 is prevented from being carelessly turned ON, because the LCD panel unit 86 is positioned at the retracted position while carrying the binocular telescope with the digital camera. Namely, the batteries 92 can be protected from being subjected to wasteful consumption.

Of course, as shown in FIG. 13, in a case where the display selection switch 104 is arranged so as to be hidden behind the LCD panel unit 86 itself when being at the retracted position, the projection 118 may be omitted from the LCD panel unit 86.

Although the above-mentioned embodiments are directed to a binocular telescope containing a digital camera, the concept of the present invention may be embodied in another optical viewer instrument containing a digital camera, such as a single telescope.

Also, in the above-mentioned embodiments, although the casing is formed by a main casing section and a movable casing section slidably engaged with each other for the interpupillary adjustment of the right and left telescopic lens systems, the concept of the present invention may be embodied in another type of binocular telescope containing a digital camera, for example, a binocular telescope in which both right and left telescopic lens systems are rotatable around an axis of a focussing rotary wheel for the interpupillary adjustment of the right and left telescopic lens systems.

Finally, it will be understood by those skilled in the art, that the foregoing descriptions are of preferred embodiments of the instrument, and that various changes and modifications may be made to the present invention without departing from the spirit and scope thereof.

The present disclosure relates to subject matters contained in Japanese Patent Applications No. 2001-301664 (filed on Sep. 28, 2001) and No. 2002-035031 (filed on Feb. 13, 2002), which are expressly incorporated herein, by reference, in their entirety.

What is claimed is:

1. An optical viewer instrument with a photographing function, comprising:
- a telescopic optical system for observing an object, said telescopic optical system including a first part and a second part which are relatively and translationally movable with respect to each other;
- a digital camera system including a photographing optical system and an image sensor associated with each other such that the object is formed as a photographic image on a light-receiving surface of said image sensor through said photographing optical system;
- a casing that houses said telescopic optical system and said digital camera system;
- a manually-operable rotary wheel rotatably provided in said casing such that a portion of said manually-operable rotary wheel is exposed to the outside through an opening formed in said casing;
- a focussing mechanism associated with said telescopic optical system such that a rotational movement of said manually-operable rotary wheel is converted into a relatively-translational movement between the first and second parts of said telescopic optical system to bring the object into focus through the telescopic optical system; and a display panel unit for displaying the object to be photographed by said digital camera system on a display screen thereof, said display panel unit being mounted on said casing so as to be movable between a retracted position where the display screen of said display panel unit is close to a wall surface of said casing and a display position where the display screen of said display panel unit is directed to a side of an ocular optical system of said telescopic optical system, wherein said manually-operable rotary wheel is arranged such that the exposed portion of said manually-operable rotary wheel is hidden behind said display panel unit when being at said retracted position.

2. An optical viewer instrument with a photographing function as set forth in claim 1, wherein the first part of said telescopic optical system is provided at an immovable position in said casing, and the second part of said telescopic optical system is translationally movable with respect to the first part of said telescopic optical system, the second part of said telescopic optical system being completely retracted in said casing when being closest to the first part of said telescopic optical system.

3. An optical viewer instrument with a photographing function as set forth in claim 1, wherein said display panel unit is disposed on a top wall of said casing.

4. An optical viewer instrument with a photographing function as set forth in claim 1, further comprising a display selection switch provided on said casing to select whether the object to be photographed should be displayed as a motion picture on the display screen of said display panel unit, wherein said manually-operable rotary wheel is arranged such that said display selection switch is hidden together with said manually-operable rotary wheel behind said display panel unit when being at said retracted position.

5. An optical viewer instrument with a photographing function as set forth in claim 4, wherein said display panel unit has a projection integrally extended therefrom, and said display selection switch is hidden behind said projection when said display panel unit is at said retracted position.

6. An optical viewer instrument with a photographing function as set forth in claim 1, wherein said manually-operable rotary wheel is integrally formed around a tubular shaft, and said photographing optical system is housed in said tubular shaft.

7. An optical viewer instrument with a photographing function as set forth in claim 6, wherein said photographing optical system is relatively and translationally movable in said tubular shaft with respect to said image sensor, further comprising a focussing mechanism for said photographing optical system provided between said tubular shaft and said photographing optical system to convert the rotational movement of said tubular shaft into a translational movement of said photographing optical system to focus the object on the light-receiving surface of said image sensor.

8. An optical viewer instrument with a photographing function as set forth in claim 1, wherein said telescopic optical system is defined as a first telescopic optical system, further comprising a second telescopic optical system including a first part and a second part which are relatively and translationally movable with respect to each other, the object being observed through both said first and second telescopic optical systems.

9. An optical viewer instrument with a photographing function as set forth in claim 8, wherein said casing includes two casing sections movably engaged with each other, said respective first and second telescopic optical systems being assembled in said casing sections such that a distance between the optical axes of said first and second telescopic optical systems is adjustable by relatively moving one of said casing sections with respect to the remaining casing section.

10. An optical viewer instrument with a photographing function as set forth in claim 9, wherein one of said casing sections is slidably engaged with the remaining casing section such that the optical axes of said first and second telescopic optical systems are movable in a common geometric plane by relatively sliding one of said casing sections with respect to the remaining casing section.

11. An optical viewer instrument with a photographing function as set forth in claim 10, wherein the respective first parts of said first and second telescopic optical systems are provided at immovable positions in said casing sections, and the respective second parts of said first and second telescopic optical system are translationally movable with respect to the first parts of said first and second telescopic optical systems, the respective second parts of said first and second telescopic optical systems being completely retracted in said casing sections when being closest to the first parts of said first and second telescopic optical systems.

12. An optical viewer instrument with a photographing function as set forth in claim 11, wherein said manually-operable rotary wheel is integrally formed around a tubular shaft, and said photographing optical system is housed in said tubular shaft.

13. An optical viewer instrument with a photographing function as set forth in claim 12, wherein said photographing optical system is relatively and translationally movable in said tubular shaft with respect to said image sensor, further comprising a focussing mechanism for said photographing optical system provided between said tubular shaft and said photographing optical system to convert the rotational movement of said tubular shaft into a translational movement of said photographing optical system to focus the object on the light-receiving surface of said image sensor.

* * * * *